United States Patent
Qiu et al.

(10) Patent No.: US 12,481,801 B2
(45) Date of Patent: Nov. 25, 2025

(54) METHOD, DEVICE, ELECTRONIC DEVICE, AND COMPUTER-READABLES STORAGE MEDIUM FOR AUTOMATIC STONE ARRANGEMENT

(71) Applicant: VEEGOO TECHNOLOGY CO., LTD., Foshan (CN)

(72) Inventors: Jianping Qiu, Foshan (CN); Zhongyuan Li, Foshan (CN); Yumin Chen, Foshan (CN); Yuchi Qian, Foshan (CN)

(73) Assignee: VEEGOO TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/021,615

(22) Filed: Jan. 15, 2025

(65) Prior Publication Data
US 2025/0232074 A1    Jul. 17, 2025

Related U.S. Application Data

(63) Continuation of application No. PCT/CN2024/139919, filed on Dec. 17, 2024.

(30) Foreign Application Priority Data

Feb. 29, 2024 (CN) .......................... 202410223626.2

(51) Int. Cl.
  *G06F 30/13* (2020.01)
  *G06F 30/27* (2020.01)
(52) U.S. Cl.
  CPC .............. *G06F 30/13* (2020.01); *G06F 30/27* (2020.01)

(58) Field of Classification Search
  CPC ........... G06F 30/00; G06F 30/13; G06F 30/27
  (Continued)

(56) References Cited

FOREIGN PATENT DOCUMENTS

| CN | 114053712 A | 2/2022 |
|---|---|---|
| CN | 114546608 A | 5/2022 |

(Continued)

OTHER PUBLICATIONS

Huang, Nai-Chieh et al, "PPO-Clip Attains Global Optimality: Towards Deeper Understandings of Clipping", 2024, the Thirty-Eighth AAAI Conference on Artificial Intelligence, Association for the Advancement of Artificial Intelligence. (Year: 2024).*

*Primary Examiner* — Cedric Johnson

(57) ABSTRACT

An automatic stone arrangement method including: (1) a stone arrangement simulation environment is built; an action space and a return function are designed based on rules that location of parts must be inside raw materials, the parts must not overlap with each other, and utilization of the raw materials is maximized; (2) a PPO-Clip algorithm model including an Actor-Critic network is constructed; both Actor neural network and Critic neural network are trained at the same time in an Actor-Critic algorithm; (3) based on a new production order of stone parts, images, which are obtained through preprocessing a part image and a raw material image corresponding to the new production order, are used as an input to a trained PPO-Clip algorithm model; and action instruction for arranging the parts are outputted to complete an automatic arrangement task under the new production order.

3 Claims, 3 Drawing Sheets

(58) Field of Classification Search
USPC .............................................................. 703/1
See application file for complete search history.

(56) References Cited

FOREIGN PATENT DOCUMENTS

| | | | |
|---|---|---|---|
| CN | 115456867 A | * | 12/2022 |
| CN | 116245007 A | * | 6/2023 |
| CN | 116257085 A | | 6/2023 |
| CN | 116663610 A | | 8/2023 |
| CN | 116823468 A | | 9/2023 |

* cited by examiner

METHOD, DEVICE, ELECTRONIC DEVICE, AND COMPUTER-READABLES STORAGE MEDIUM FOR AUTOMATIC STONE ARRANGEMENT

CROSS-REFERENCE TO RELATED APPLICATIONS

This application is a continuation of International Patent Application No. PCT/CN2024/139919, filed on Dec. 17, 2024, which claims the benefit of priority from Chinese Patent Application No. 202410223626.2, filed on Feb. 29, 2024. The content of the aforementioned application, including any intervening amendments thereto, is incorporated herein by reference in its entirety.

TECHNICAL FIELD

This application relates to stone processing, and more particularly to a method, a device, an electronic device, and a computer-readable storage medium for automatic stone arrangement.

BACKGROUND

Stone processing is a complex process that requires special skills and specialized equipment. For stone cutting, the optimization of stone arrangement has always been a challenge in stone production. Specifically, within the spatial layout of the given raw material, several parts of the required shape and size need to be arranged without overlapping, thus requiring an optimal arrangement solution. The traditional arrangement methods often rely on manual experience, resulting in low efficiency and low arrangement accuracy. In recent years, with the development and application of computer science, modern manufacturing and processing industry has trended towards automation and intelligence, computer-automated layout has become the trend for solving arrangement problems.

At present, the arrangement problem can be divided into two problems: part positioning and sequencing. The positioning problem involves geometrical operations, solving the critical polygon is the key. The sequencing problem often uses heuristic algorithms, which optimize the arrangement order of items by adjusting parameters to achieve better quality and material utilization. However, these methods still have some defects. Firstly, the critical polygon calculation for irregular parts is very complex, and most calculation methods cannot handle concave or hole-containing parts. Secondly, the heuristic algorithm is an approximate solution, which may fall into the local optimal solution and cannot find the global optimal solution. Moreover, the algorithm needs to determine many parameters and variables, such as mutation rate and population size. If these parameters are not set correctly, it may lead to inaccurate results or low computational efficiency.

Therefore, the existing stone arrangement methods based on critical polygons and heuristic algorithms can achieve certain results, but there are still some limitations. In practical applications, the limitations need to improve and optimize to obtain a better stone arrangement solution.

SUMMARY

In view of the deficiencies in the prior art, this application provides an automatic stone arrangement method based on image and deep reinforcement learning, which constructs an Actor-Critic convolutional network model, uses a PPO-Clip algorithm, does not need to calculate a critical polygon of a part to determine the overlap, and can continuously update and optimize the action strategy through trial-and-error reinforcement learning.

Technical solutions of this application are described as follows.

In a first aspect, this application provides an automatic stone arrangement method based on image and deep reinforcement learning, comprising:

(1) building a stone arrangement simulation environment; and designing an action space and a return function based on rules that parts are provided inside a raw material, the parts do not overlap with each other, and a utilization of the raw material is maximized;

(2) building a Proximal Policy Optimization-Contrastive Language-Image Pre-training (PPO-Clip) algorithm model with an Actor-Critic network; based on the stone arrangement simulation environment, the action space and the return function, training simultaneously an Actor neural network and a Critic neural network by using an Actor-Critic algorithm; inputting a current state s into the Actor neural network, wherein the current state s comprises raw material information and to-be-arranged part information; output a comprises a serial number of a part, a displacement of the part, and a rotation angle of the part; representing a probability of the output a in the current state s through a policy function $\pi_\theta(a|s)$; and outputting, by the Critic neural network, a prediction of the return function according to an action of the Actor neural network in the current state s; and the network output is the prediction of the return function of step (1);

wherein the Actor neural network and the Critic neural network have a same convolutional network structure; an input of a first convolutional layer is images obtained through preprocessing a part image and a raw material image in the current state s; the number of output channels, a convolution kernel size, and a step size of the first convolutional layer are set; a first max-pooling is performed; the number of input channels, the number of output channels, a convolution kernel size, and a step size of a multilayer convolutional layer are set, respectively; a second max-pooling is performed; a multi-dimensional feature image outputted by the multilayer convolutional layer and a pooling layer is flattened into a one-dimensional vector; the one-dimensional vector is performed with multi-scale feature fusion by a spatial pyramid pooling (SPP) layer and then outputted through a fully connected layer; the Actor neural network outputs an action taken in the current state s, and the Critic neural network outputs a return size obtained after taking the action in the current state s; and an Actor-Critic network loss function defined by the PPO-Clip algorithm model is expressed as:

$$L^{Clip}(s, a, \theta_k, \theta) = \min\left[r(\theta)A^{\pi\theta_k}(s, a), \mathrm{clip}[r(\theta), 1-\varepsilon, 1+\varepsilon]A^{\pi\theta_k}(s, a)\right];$$

where $$r(\theta) = \frac{\pi_\theta(a|s)}{\pi_{\theta_k}(a|s)}$$

is a ratio of a new strategy and an old strategy;

$$A^{\pi\theta_k}(s,a) = Q^{\pi\theta_k}(s, a) - V^{\pi\theta_k}(s, a)$$

is a dominance function which is a difference between an action value function and a strategy value function; Clip is a clipping function; ε is a hyperparameter;

$$clip(x, 1-\varepsilon, 1+\varepsilon) = \begin{cases} x & 1-\varepsilon \le x \le 1+\varepsilon \\ 1-\varepsilon & x < 1-\varepsilon \\ 1+\varepsilon & x > 1+\varepsilon \end{cases} ;$$

$\theta_k$ is a k-th network parameter; θ is an updated network parameter; $\pi_\theta(a|s)$ is the new strategy; $\pi\theta_k(a|s)$ is the old strategy; Q is the action value function; V is a state value function; and x is a function independent variable $$x = r(\theta) = \frac{\pi_\theta(a|s)}{\pi\theta_k(a|s)};$$

and (3) based on a trained PPO-Clip algorithm model and a new production order of a stone part, providing images, obtained through preprocessing a corresponding part image and a corresponding raw material image to the new production order, as an input to the trained PPO-Clip algorithm model; and outputting an action instruction for arranging the part to complete an automatic arrangement task under the new production order;

the step (1) is performed through steps of:

(1-1) setting a length and a width of a raw material image according to requirements of size and pixel accuracy of a stone raw material;

(1-2) according to rules that the parts are provided inside the raw material, the parts do not overlap with each other, and the utilization of the raw material is maximized, dividing a design action into three sub-actions: part selection, part translation, and part rotation; discretizing the rotation angle into 2kπ/N, where k=0, 1, . . . , N−1, and N is a positive integer, and the return function is expressed as:

$$R_{t+1} = \begin{cases} +S_{Arranged\ part}/(h \times L_{Arranged\ part}) & \text{No parts overlap} \\ -Fa & \text{There are overlapping parts} \\ -Fa & \text{Parts exceed raw material boundary} \end{cases} ;$$

wherein $S_{Arranged\ part}$ is a sum of areas of parts that have been arranged onto the raw material; $L_{Arranged\ part}$ is a total length of the parts that have been arranged onto the raw material; h is a width of the raw material; and Fa is a positive number.

In an embodiment, in the step (2), the first convolutional layer has the number of output channels of 32, the convolution kernel size of 8×8, and the step size of 2;

a second convolutional layer has the number of input channels of 32, the number of output channels of 64, a convolution kernel size of 4×4, and a step size of 2; and a third convolutional layer has the number of input channels of 64, the number of output channels of 64, a convolutional kernel size of 3×3, and a step size of 1.

In an embodiment, wherein in the step (1), a pixel value of each point in the raw material image is set to 1.

In a second aspect, this application provides an automatic stone arrangement device, comprising:
an environment simulation module;
a model building module; and
a model training module;
wherein the environment simulation module is configured to build a stone arrangement simulation environment; and design an action space and a return function based on rules that parts are provided inside a raw material, the parts do not overlap with each other, and a utilization of the raw material is maximized;
the model building module is configured to build a PPO-Clip algorithm model with an Actor-Critic network; based on the stone arrangement simulation environment, the action space and the return function, train simultaneously an Actor neural network and a Critic neural network by using an Actor-Critic algorithm; input a current state s into the Actor neural network, wherein the current state s comprises raw material information and to-be-arranged part information; output a comprises a serial number of a part, a displacement of the part, and a rotation angle of the part; represent a probability of the output part in the current state s through a policy function $\pi_\theta(a|s)$; and output, by the Critic neural network, a prediction of the return function according to an action of the Actor neural network in the current state s; and the network output is the prediction of the return function of step (1);
wherein the Actor neural network and the Critic neural network have a same convolutional network structure; an input of a first convolutional layer is images obtained through preprocessing a part image and a raw material image in the current state s; the number of output channels, a convolution kernel size, and a step size of the first convolutional layer are set; a first max-pooling is performed; the number of input channels, the number of output channels, a convolution kernel size, and a step size of a multilayer convolutional layer are set, respectively; a second max-pooling is performed; a multi-dimensional feature image outputted by the multilayer convolutional layer and a pooling layer is flattened into a one-dimensional vector; the one-dimensional vector is performed with multi-scale feature fusion by a SPP layer and then outputted through a fully connected layer; the Actor neural network outputs an action taken in the current state s, and the Critic neural network outputs a return size obtained after taking the action in the current state s; and
an Actor-Critic network loss function defined by the PPO-Clip algorithm model is expressed as:

$$L^{Clip}(s, a, \theta_k, \theta) = \min\ [r(\theta)A^{\pi\theta_k}(s, a), clip[r(\theta), 1-\varepsilon, 1+\varepsilon]A^{\pi\theta_k}(s, a)];$$

where $$r(\theta) = \frac{\pi_\theta(a|s)}{\pi\theta_k(a|s)}$$

is a ratio of a new strategy and an old strategy;

$$A^{\pi\theta_k}(s,a) = Q^{\pi\theta_k}(s, a) - V^{\pi\theta_k}(s, a)$$

is a dominance function which is a difference between an action value function and a strategy value function; Clip is a clipping function; ε is a hyperparameter;

$$\text{clip}(x, 1-\varepsilon, 1+\varepsilon) = \begin{cases} x & 1-\varepsilon \le x \le 1+\varepsilon \\ 1-\varepsilon & x < 1-\varepsilon \\ 1+\varepsilon & x > 1+\varepsilon \end{cases}$$

$\theta_k$ is a k-th network parameter; $\theta$ is an updated network parameter; $\pi_\theta(a|s)$ is the new strategy; $\pi\theta_k(a|s)$ is the old strategy; Q is the action value function; V is a state value function; and x is a function independent variable, x=

$$x = r(\theta) = \frac{\pi_\theta(a|s)}{\pi\theta_k(a|s)};$$

and the model training module is configured to base on a trained PPO-Clip algorithm model and a new production order of a stone part, and provide images, which are obtained through preprocessing a corresponding part image and a corresponding raw material image to the new production order, as an input to the trained PPO-Clip algorithm model; and output an action instruction for a to-be-arranged part to complete an automatic arrangement task under the new production order;

the environment simulation module comprises an image generation module and a function design module;

the image generation module is configured to set a length and a width of a raw material image according to requirements of size and pixel accuracy of a stone raw material; and the function design module is configured to divide a design action into three sub-actions: part selection, part translation, and part rotation according to rules that the parts are provided inside the raw material, the parts do not overlap with each other, and the utilization of the raw material is maximized; and discretize the rotation angle into 2kπ/N, where k=0, 1, ..., N−1, and N is a positive integer, and the return function is expressed as:

$$R_{t+1} = \begin{cases} +S_{Arranged\ part}/(h \times L_{Arranged\ part}) & \text{No parts overlap} \\ -Fa & \text{There are overlapping parts} \\ -Fa & \text{Parts exceed raw material boundary} \end{cases};$$

wherein $S_{Arranged\ part}$ is a sum of areas of parts that have been arranged onto the raw material; $L_{Arranged\ part}$ is a total length that has been arranged onto the raw material; h is a width of the raw material; and Fa is a positive number.

In a third aspect, this application provides an electronic device, comprising:

a processor;
a memory; and
a program;
wherein the memory is configured to store the program; and the program is executed by the processor to implement the above automatic stone arrangement method.

In a fourth aspect, this application provides a non-transitory computer-readable storage medium, wherein the non-transitory computer-readable storage medium stores a program; and the program is configured to be executed by a processor to implement the above automatic stone arrangement method.

Compared to the prior art, this application has the following beneficial effects.

An automatic stone arrangement method based on image and deep reinforcement learning provided in this application constructs an Actor-Critic convolutional network model, uses the PPO-Clip algorithm, and does not need to calculate the critical polygon of the part to determine the overlap. Since the pixel value of the image will be updated after the part is placed on the raw material, it is only necessary to verify that the pixel value within the range of the part is not abnormal under the current action, to avoid that the critical polygon calculation method is not applicable to concave or hole-containing parts. Moreover, this application greatly reduces the setting of hyper-parameters, and the parameters are obtained through training, avoiding inaccurate algorithmic results or low computational efficiency due to incorrect setting of hyper-parameters. Furthermore, compared to heuristic algorithms, this application can continuously update and optimize its own action strategy through trial-and-error reinforcement learning, and thus has adaptive properties. The reinforcement learning can also get better results when facing complex and unknown situations.

DETAILED DESCRIPTION OF EMBODIMENTS

The technical solutions of the disclosure will be described in detail below in combination with the drawings in the embodiments. Obviously, described below are merely some embodiments of the disclosure, which are not intended to limit the disclosure. For those skilled in the art, other embodiments obtained based on these embodiments without paying creative efforts should fall within the scope of the disclosure defined by the appended claims.

The technical solutions of the present disclosure are further described below by means of embodiments in conjunction with the accompanying drawings.

Figure 1:
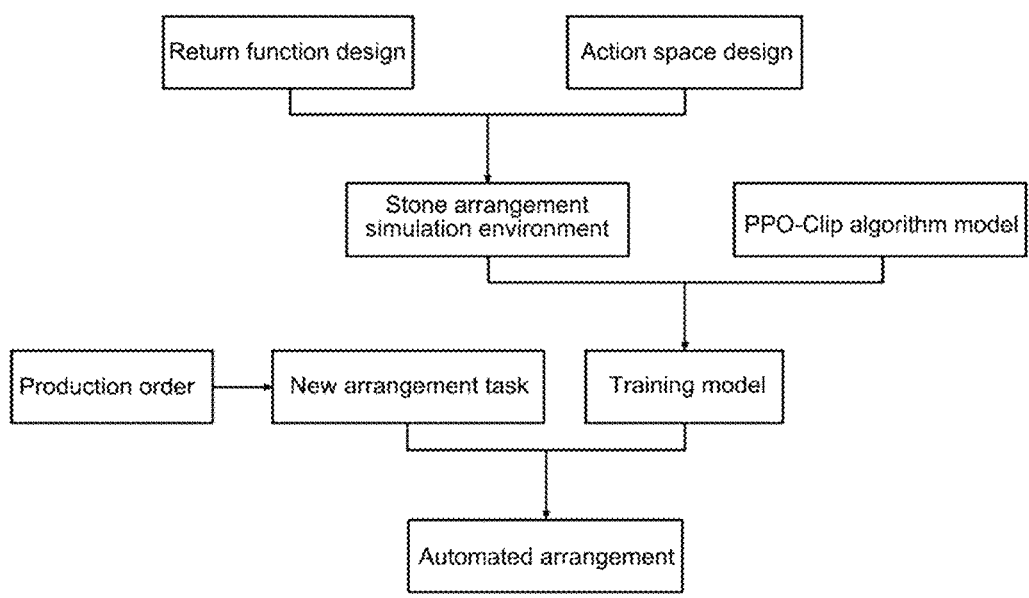
FIG. 1 is a flowchart of an automatic stone arrangement method according to an embodiment of the present disclosure.
Figure 2:
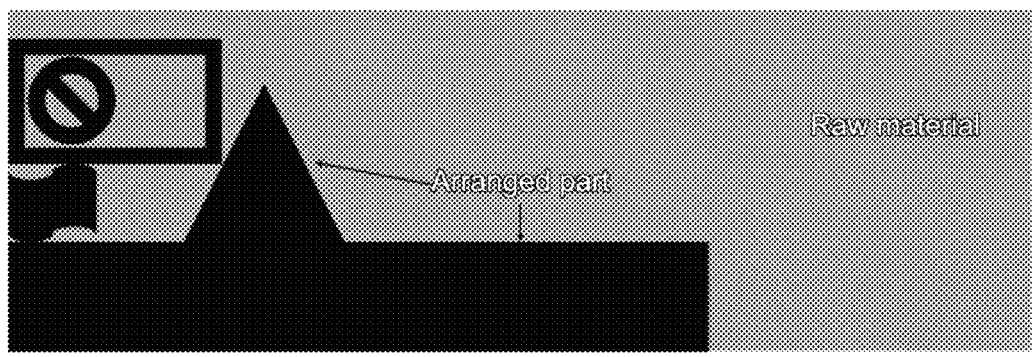
FIG. 2 is a schematic diagram of a state space according to an embodiment of the present disclosure.
Figure 3:
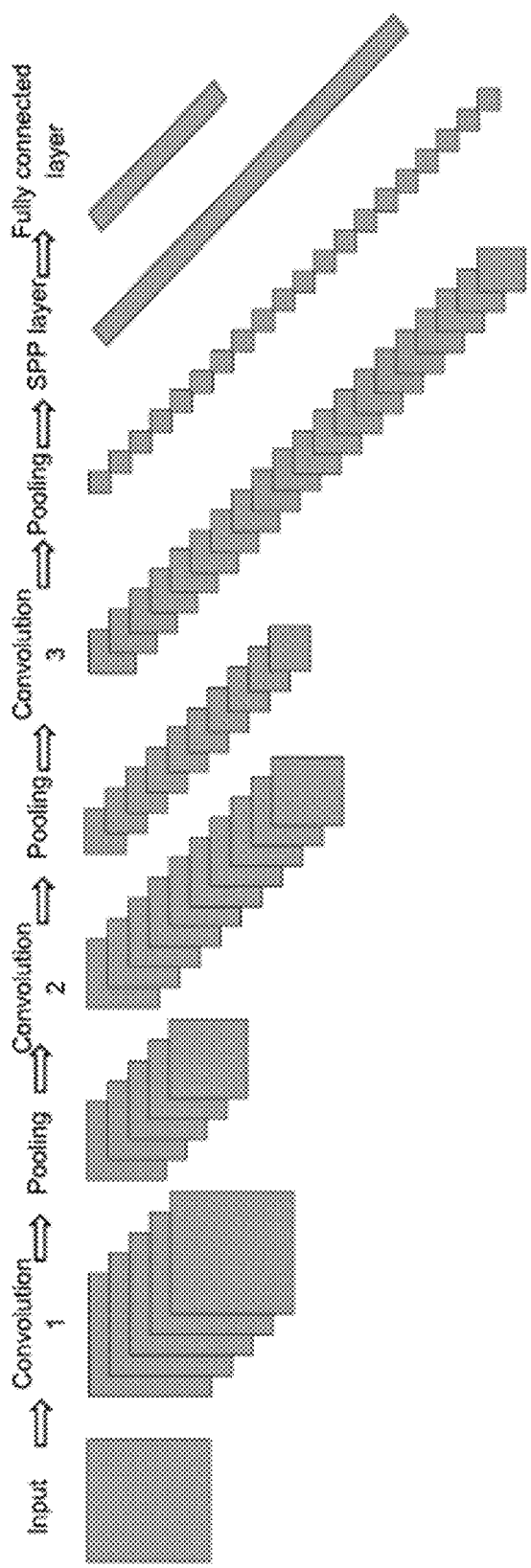
FIG. 3 schematically shows a structure of Actor and Critic networks in a PPO algorithm according to an embodiment of the present disclosure.

As shown in FIGS. 1-3, an automatic stone arrangement method based on image and deep reinforcement learning includes the following steps (1)-(3).

(1) A stone arrangement simulation environment is built. A corresponding action space and a corresponding return function are designed based on rules that location of the parts must be inside the raw material, the parts must not overlap with each other, and the utilization of the raw material is maximized.

(2) A PPO-Clip algorithm model including an Actor-Critic network is constructed. Both Actor neural network and Critic neural network are trained at the same time in the Actor-Critic algorithm.

(3) Based on the model obtained from the training and the new production order of stone parts, the images, which are obtained through preprocessing the part image and the raw material image corresponding to the new production order, are used as the input to the trained PPO-Clip algorithm model. The action instruction for arranging the parts are outputted to complete the automatic arrangement task under the emergence of the new production order.

The automatic stone arrangement method based on image and deep reinforcement learning provided herein constructs an Actor-Critic convolutional network model, uses the PPO-Clip algorithm, and does not need to calculate the critical polygon of the part to determine the overlap. Since the pixel value of the image will be updated after the part is placed on the raw material, it is only necessary to verify that the pixel value within the range of the part is not abnormal under the current action, to avoid that the critical polygon calculation method is not applicable to concave or hole-containing parts. Moreover, this application greatly reduces the setting of hyper-parameters, and the parameters are obtained through training, avoiding inaccurate algorithmic results or low computational efficiency due to incorrect setting of hyper-parameters. Furthermore, compared to heuristic algorithms, this application can continuously update and optimize its own action strategy through trial-and-error reinforcement learning, and thus has adaptive properties. The reinforcement learning can also get better results when facing complex and unknown situations.

In an embodiment, the step (1) includes steps (1-1)-(1-2).

(1-1) The length and the width of the raw material image are set according to requirements of size and pixel accuracy of the stone raw material.

The size of the stone raw material can be set according to the actual need.

(1-2) According to the rules that location of the parts must be inside the raw material, the parts must not overlap with each other, and the utilization of the raw material is maximized, the design action is divided into three sub-actions: part selection, part translation, and part rotation; and the rotation angle is discretized into $2k\pi/N$, where $k=0, 1, \ldots, N-1$, and N is a positive integer. The designed return function is expressed as:

$$R_{t+1} = \begin{cases} +S_{Arranged\ part}/(h \times L_{Arranged\ part}) & \text{No parts overlap} \\ -Fa & \text{There are overlapping parts} \\ -Fa & \text{Parts exceed raw material boundary} \end{cases}$$

In the above formula, $S_{Arranged\ part}$ is a sum of areas of parts that have been arranged onto the raw material; $L_{Arranged\ part}$ is the total length of the parts that have been arranged onto the raw material; h is a width of the raw material; and Fa is a positive number.

For example, the designed return function is expressed as:

$$R_{t+1} = \begin{cases} +S_{Arranged\ part}/(h \times L_{Arranged\ part}) & \text{No parts overlap} \\ -100 & \text{There are overlapping parts} \\ -100 & \text{Parts exceed raw material boundary} \end{cases}$$

The arranged parts do not overlap with each other. The reward value is the current area utilization rate. If there is an overlap between the parts, or, the parts exceed the boundary of the raw material, the reward value is −100. For the rule that parts must be arranged inside the raw material, this disclosure can be solved by using the envelope rectangle, the envelope rectangle of the parts is limited to the inside of the raw material when the envelope rectangle takes the translation action or the rotation action. For the rule that parts must not overlap each other, when determining overlap, because the pixel value of the position after the part is placed on the raw material is −1: if there is no overlap, the pixel value of the position is all 0; and if there is an overlap, the pixel value is less than 0, resulting in anomalies. Thus, it is only necessary to verify that the pixel value range of the part under the current action is abnormal or not, so as to simplify the overlap judgment of the part. For maximizing the utilization of raw materials, $S_{Arranged\ part}/(h \times L_{Arranged\ part})$ represents the utilization rate. The higher the utilization rate is, the higher the reward is, indicating that the model will arrange the materials according to the standard of the higher utilization rate.

Optimally, in step (2), the PPO-Clip algorithm model including the Actor-Critic network is constructed. Based on the stone arrangement simulation environment, the action space and the return function, the Actor neural network and the Critic neural network are trained simultaneously by using an Actor-Critic algorithm. The Actor neural network inputs the current state s. The current state s includes raw material information and to-be-arranged part information. The output a is the serial number of the part, the displacement of the part, and the rotation angle of the part. The policy function $\pi_\theta(a|s)$ represents the probability of the output a in the input state s. According to the action of the Actor neural network in the current state s, the Critic neural network outputs the prediction of the return function. The network output is the prediction of the return function of step (1).

The Actor network learns the probability distribution on the set of actions based on the input information and generates actions based on the probabilities, and adjusts the strategy based on the evaluation of the Critic network. The Critic network evaluates the value of the strategy based on the actions of the Actor network, and feeds back to the Actor network. The network output is the prediction of the return function.

The Actor neural network and the Critic neural network have the same convolutional network structure. The input of the first convolutional layer is images obtained through preprocessing the part image and the raw material image in the current state. The number of output channels, the convolution kernel size, and the step size of the first convolutional layer are set. The max-pooling is performed, that is, downsampling the image, and taking the maximum value in the adjacent pixels. The number of input channels, the number of output channels, the convolution kernel size, and the step size of the multilayer convolutional layer are set, respectively. The max-pooling is performed. In the convolutional neural network, the multi-dimensional feature image outputted by the multilayer convolutional layer and the pooling layer is expanded into the one-dimensional vector by the flatten operation. Then, the one-dimensional vector is performed with multi-scale feature fusion by the spatial pyramid pooling (SPP) layer, and finally outputted through the fully connected layer. The output of the Actor neural network is the action taken in the current state s, and the output of the Critic neural network is the return size obtained after taking the action in the current state.

The Actor-Critic network loss function defined by the PPO-Clip algorithm model is expressed as:

$$L^{clip}(s, a, \theta_k, \theta) = \min\left[r(\theta)A^{\pi\theta_k}(s, a), \text{clip}[r(\theta), 1-\varepsilon, 1+\varepsilon]A^{\pi\theta_k}(s, a)\right].$$

In above formula, $$r(\theta) = \frac{\pi_\theta(a|s)}{\pi\theta_k(a|s)}$$

is the ratio of a new strategy and an old strategy;

$$A^{\pi\theta_k}(s,a) = Q^{\pi\theta_k}(s, a) - V^{\pi\theta_k}(s, a)$$

is a dominance function which is the difference between an action value function and a strategy value function; Clip is a clipping function; $\varepsilon$ is a hyperparameter;

$$\text{clip}(x, 1-\varepsilon, 1+\varepsilon) = \begin{cases} x & 1-\varepsilon \le x \le 1+\varepsilon \\ 1-\varepsilon & x < 1-\varepsilon \\ 1+\varepsilon & x > 1+\varepsilon \end{cases}$$

$\theta_k$ is a k-th network parameter; $\theta$ is an updated network parameter; $\pi_\theta(a|s)$ is the new strategy; $\pi\theta_k(a|s)$ is the old strategy; Q is the action value function; V is a state value function; and x is a function independent variable, $$x = r(\theta) = \frac{\pi_\theta(a|s)}{\pi\theta_k(a|s)}.$$

Preferably, in step (2), the input of the first layer convolutional is the images obtained by preprocessing the part image and the raw material image in the current state. The number of output channels is 32, the convolutional kernel size is 8×8, and the step size is 2. The max-pooling is performed.

The second convolutional layer has the number of input channels of 32, the number of output channels of 64, the convolution kernel size of 4×4, and the step size of 2. The max-pooling is performed.

The third convolutional layer has the number of input channels of 64, the number of output channels of 64, the convolutional kernel size of 3×3, and the step size of 1. The max-pooling is performed.

Preferably, in step (1), the pixel value of each point in the raw material image is set to 1.

In step (1), only the stone arrangement problem can be considered, and there is no need to consider color, texture and other information of the raw material, so the pixel value of each point only needs to be set to 1.

An automatic stone arrangement device provided in the disclosure includes an environment simulation module, a model building module and a model training module.

The environment simulation module is configured to build the stone arrangement simulation environment, and design the corresponding action space and corresponding return function according to the rules that the position of the parts must be inside the raw material, the parts must not overlap with each other, and the utilization rate of the raw material is maximized.

The model building module is configured to build the PPO-Clip algorithm model including the Actor-Critic network, and train both the Actor neural network and the Critic neural network in the Actor Critic algorithm at the same time.

Preferably, the model training module is configured to base on the trained PPO-Clip algorithm model and the new production order of the stone part, and provide images, which are obtained through preprocessing the corresponding part image and the corresponding raw material image to the new production order, as the input to the network; and output the action instruction for the to-be-arranged part to complete the automatic arrangement task under the new production order.

Preferably, the model building module is configured to build the PPO-Clip algorithm model including the Actor-Critic network; based on the stone arrangement simulation environment, the action space and the return function, and train simultaneously the Actor neural network and the Critic neural network by using the Actor-Critic algorithm. The Actor neural network inputs the current state s. The current state s includes raw material information and to-be-arranged part information. The output a is the serial number of the part, the displacement of the part, and the rotation angle of the part. The policy function $\pi_\theta(a|s)$ represents the probability of the output a in the current state s. The Critic neural network outputs the prediction of the return function according to the action of the Actor neural network in the current state s. The network output is the prediction of the return function of step (1).

The Actor neural network and the Critic neural network have the same convolutional network structure. The input of the first convolutional layer is images obtained through preprocessing the part image and the raw material image in the current state. The number of output channels, the convolution kernel size, and the step size of the first convolutional layer are set. The max-pooling is performed. The number of input channels, the number of output channels, the convolution kernel size, and the step size of the multilayer convolutional layer are set, respectively. The max-pooling is performed. In the convolutional neural network, the multi-dimensional feature image outputted by the multilayer convolutional layer and the pooling layer is expanded into the one-dimensional vector by the flatten operation. Then, the one-dimensional vector is performed with multi-scale feature fusion by the SPP layer, and finally outputted through the fully connected layer. The output of the Actor neural network is the action taken in the current state s, and the output of the Critic neural network is the return size obtained after taking the action in the current state.

The Actor-Critic network loss function defined by the PPO-Clip algorithm model is expressed as:

$$L^{Clip}(s, a, \theta_k, \theta) = \min\left[r(\theta)A^{\pi\theta_k}(s, a), \text{clip}[r(\theta), 1-\varepsilon, 1+\varepsilon]A^{\pi\theta_k}(s, a)\right].$$

In above formula, $$r(\theta) = \frac{\pi_\theta(a|s)}{\pi\theta_k(a|s)}$$

is the ratio of the new strategy and the old strategy;

$$A^{\pi\theta_k}(s,a) = Q^{\pi\theta_k}(s,a) - V^{\pi\theta_k}(s,a)$$

is the dominance function which is the difference between the action value function and the strategy value function; Clip is the clipping function; ε is the hyperparameter;

$$clip(x, 1-\varepsilon, 1+\varepsilon) = \begin{cases} x & 1-\varepsilon \le x \le 1+\varepsilon \\ 1-\varepsilon & x < 1-\varepsilon \\ 1+\varepsilon & x > 1+\varepsilon \end{cases};$$

$\theta_k$ is the k-th network parameter; $\theta$ is the updated network parameter; $\pi_\theta(a|s)$ is the new strategy; $\pi\theta_k(a|s)$ is the old strategy; Q is the action value function; V is the state value function; and x is the function independent variable, $$x = r(\theta) = \frac{\pi_\theta(a|s)}{\pi\theta_k(a|s)}.$$

Preferably, the environment simulation module includes an image generation module and a function design module.

The image generation module is configured to set the length and the width of the raw material image according to requirements of size and pixel accuracy of the stone raw material.

The function design module is configured to, according to rules that the parts are provided inside the raw material, the parts do not overlap with each other, and the utilization of the raw material is maximized, divide the design action into three sub-actions: part selection, part translation, and part rotation; and discretize the rotation angle into 2kπ/N, where k=0, 1, ..., N−1, and N is a positive integer. The return function is expressed as:

$R_{t+1} =$ $$\begin{cases} +S_{Arranged\ part}/(h \times L_{Arranged\ part}) & \text{No parts overlap} \\ -Fa & \text{There are overlapping parts} \\ -Fa & \text{Parts exceed raw material boundary} \end{cases}$$

In above formula, $S_{Arranged\ part}$ is the sum of areas of parts that have been arranged onto the raw material; $L_{Arranged\ part}$ is the total length that has been arranged onto the raw material; h is the width of the raw material; and Fa is a positive number.

An electronic device provided in the disclosure includes one or more processors, a memory, and one or more programs.

The memory is configured to store one or more programs. The one or more programs are executed by one or more processors to implement the above automatic stone arrangement method in any embodiment.

A computer-readable storage medium provided in the disclosure stores a computer program. The program is executed by the processor to implement the above automatic stone arrangement method in any embodiment.

EMBODIMENT

Step 1

The stone arrangement simulation environment was built. The corresponding action space and the corresponding return function were designed based on rules that location of the parts must be inside the raw material, the parts must not overlap with each other, and the utilization of the raw material was maximized. According to the requirements of size and pixel accuracy of the stone raw material, the size of the raw material image was set to 300*100, where the length was w=300, and the width was h=100; and the pixel value of each point was set to 1.

According to the rules that location of the parts must be inside the raw material, the parts must not overlap with each other, and the utilization of the raw material was maximized, the design action was divided into three sub-actions: part selection, part translation, and part rotation. The rotation angle was discretized into 2kπ/N, where k=0, 1, ..., N−1, and N was a positive integer. The designed return function was expressed as:

$R_{t+1} =$ $$\begin{cases} +S_{Arranged\ part}/(h \times L_{Arranged\ part}) & \text{No parts overlap} \\ -100 & \text{There are overlapping parts} \\ -100 & \text{Parts exceed raw material boundary} \end{cases}$$

The arranged parts did not overlap with each other. The reward value was the current area utilization rate. If there was an overlap between the parts, or, the parts exceeded the boundary of the raw material, the reward value was −100.

For the overlap judgment, because the pixel value of the position after the part was placed on the raw material was −1: if there was no overlap, the pixel value of the position was all 0; and if there was the overlap, the pixel value was less than 0, resulting in anomalies. Thus, it was only necessary to verify that the pixel value range of the part under the current action was abnormal or not. For the rule that parts must be arranged inside the raw material, this disclosure could be solved by using the envelope rectangle, the envelope rectangle of the parts was limited to the inside of the raw material when the envelope rectangle took the translation action or the rotation action.

Step 2

The PPO-Clip algorithm model including the Actor-Critic network was constructed. The Actor-Critic algorithm needs to train both the Actor and Critic neural networks, which were responsible for learning the policy and the value function, respectively.

The Actor network learned the probability distribution on the set of actions based on the input information and generated actions based on the probabilities, and adjusted the strategy based on the evaluation of the Critic network. The input of the Actor network was the current state s (raw material information and to-be-arranged part information), and the output a was the number of the part, the displacement and the rotation angle. The strategy function represented the probability of the output a given the input state s.

The Critic network evaluated the value of the strategy based on the actions of the Actor network, and fed back to the Actor network. The network output was the prediction of the return function.

As shown in FIG. 3, the Actor neural network and the Critic neural network had the same convolutional network structure. The input of the first convolutional layer was images obtained through preprocessing the part image and the raw material image in the current state. For the first convolutional layer, the number of output channels was 32, the convolutional kernel size was 8×8, and the step size was 2. The max-pooling was performed. The second convolutional layer had the number of input channels of 32, the number of output channels of 64, the convolution kernel size of 4××4, and the step size of 2. The max-pooling was performed. The third convolutional layer had the number of input channels of 64, the number of output channels of 64, the convolutional kernel size of 3×3, and the step size of 1. The max-pooling was performed. It was expanded into one dimension using the SPP layer, and finally output through the fully connected layer.

The output of the Actor neural network was the action taken in the current state s, and the output of the Critic neural network was the return size obtained after taking the action in the current state. The input image needed to include the arranged information and the to-be-arranged part information. In this embodiment, the two pieces of information were fused into one image, as shown in the state space in FIG. 2.

The Actor-Critic network loss function defined by the PPO-Clip algorithm model was expressed as:

$$L^{Clip}(s, a, \theta_k, \theta) = \min[r(\theta)A^{\pi\theta_k}(s, a), \text{clip}[r(\theta), 1-\varepsilon, 1+\varepsilon]A^{\pi\theta_k}(s, a)]$$

In above formula, $$r(\theta) = \frac{\pi_\theta(a|s)}{\pi\theta_k(a|s)}$$

was the ratio of the new strategy and the old strategy;

$$A^{\pi\theta_k}(s,a) = Q^{\pi\theta_k}(s, a) - V^{\pi\theta_k}(s, a)$$

was the dominance function which was the difference between the action value function and the strategy value function; Clip was the clipping function; ε was the hyper-parameter;

$$\text{clip}(x, 1-\varepsilon, 1+\varepsilon) = \begin{cases} x & 1-\varepsilon \le x \le 1+\varepsilon \\ 1-\varepsilon & x < 1-\varepsilon \\ 1+\varepsilon & x > 1+\varepsilon \end{cases}.$$

$\theta_k$ was the k-th network parameter; $\theta$ was the updated network parameter; $\pi_\theta(a|s)$ is the new strategy; $\pi\theta_k(a|s)$ is the old strategy; Q was the action value function; V was the state value function; and x was the function independent variable.

The technical principles of the present disclosure are described above in connection with specific embodiments. Accordingly, the description above is merely illustrative, and is not intended to limit the scope of the disclosure. For those skilled in the art, other embodiments obtained based on these embodiments without paying creative efforts should fall within the scope of the disclosure defined by the appended claims.

What is claimed is:

1. An automatic stone arrangement method based on image and deep reinforcement learning, comprising:
   (1) building a stone arrangement simulation environment, and designing an action space and a return function based on rules that parts are provided inside a raw material, the parts do not overlap with each other, and a utilization of the raw material is maximized;
   (2) building a Proximal Policy Optimization-Contrastive Language-Image Pre-training (PPO-Clip) algorithm model with an Actor-Critic network, and based on the stone arrangement simulation environment, the action space and the return function, training simultaneously an Actor neural network and a Critic neural network by using an Actor-Critic algorithm; inputting a current state s into the Actor neural network, wherein the current state s comprises raw material information and to-be-arranged part information, output a comprises a serial number of a part, a displacement of the part, and a rotation angle of the part; representing a probability of the output a in the current state s through a policy function $\pi_\theta(a|s)$; and outputting, by the Critic neural network, a prediction of the return function according to an action of the Actor neural network in the current state s;
   wherein the Actor neural network and the Critic neural network have a same convolutional network structure, an input of a first convolutional layer is images obtained through preprocessing a part image and a raw material image in the current state s, a number of output channels, a convolution kernel size, and a step size of the first convolutional layer are set; a first max-pooling is performed; a number of input channels, the number of output channels, a convolution kernel size, and a step size of a multilayer convolutional layer are set, respectively; a second max-pooling is performed; a multi-dimensional feature image outputted by the multilayer convolutional layer and a pooling layer is flattened into a one-dimensional vector, and the one-dimensional vector is performed with multi-scale feature fusion by a spatial pyramid pooling (SPP) layer and then outputted through a fully connected layer; the Actor neural network outputs the action taken in the current state s, and the Critic neural network outputs a return size obtained after taking the action in the current state s; and
   an Actor-Critic network loss function defined by the PPO-Clip algorithm model is expressed as:

$$L^{Clip}(s, a, \theta_k, \theta) = \min[r(\theta)A^{\pi\theta_k}(s, a), \text{clip}[r(\theta), 1-\varepsilon, 1+\varepsilon]A^{\pi\theta_k}(s, a)]$$

where $$r(\theta) = \frac{\pi_\theta(a|s)}{\pi\theta_k(a|s)}$$

is a ratio of a new strategy and an old strategy, $$A^{\pi\theta_k}(s,a) = Q^{\pi\theta_k}(s, a) - V^{\pi\theta_k}(s, a)$$

is a dominance function which is a difference between an action value function and a strategy value function, Clip is a clipping function, ε is a hyperparameter, $$clip(x, 1-\varepsilon, 1+\varepsilon) = \begin{cases} x & 1-\varepsilon \leq x \leq 1+\varepsilon \\ 1-\varepsilon & x < 1-\varepsilon \\ 1+\varepsilon & x > 1+\varepsilon \end{cases};$$

$\theta_k$ is a k-th network parameter, $\theta$ is an updated network parameter, $\pi_\theta(a|s)$ is the new strategy, $\pi\theta_k(a|s)$ is the old strategy, Q is the action value function, V is a state value function, and x is a function independent variable; and (3) based on a trained PPO-Clip algorithm model and a new production order of a stone part, providing images, obtained through preprocessing a corresponding part image and a corresponding raw material image to the new production order, as an input to the trained PPO-Clip algorithm model, and outputting an action instruction for arranging the part to complete an automatic arrangement task under the new production order;

the step (1) is performed through steps of:

(1-1) setting a length and a width of a raw material image according to requirements of size and pixel accuracy of a stone raw material;

(1-2) according to rules that the parts are provided inside the raw material, the parts do not overlap with each other, and the utilization of the raw material is maximized, dividing a design action into three sub-actions: part selection, part translation, and part rotation, and discretizing the rotation angle into $2k\pi/N$, where k=0, 1, ..., N−1, and N is a positive integer, and the return function is expressed as:

$$R_{t+1} = \begin{cases} +S_{Arranged\ part}/(h \times L_{Arranged\ part}) & \text{No parts overlap} \\ -Fa & \text{There are overlapping parts} \\ -Fa & \text{Parts exceed raw material boundary} \end{cases}$$

wherein $S_{Arranged\ part}$ is a sum of areas of parts that have been arranged onto the raw material, $L_{Arranged\ part}$ is a total length of the parts that have been arranged onto the raw material, h is a width of the raw material, and Fa is a positive number;

wherein in the step (1), a pixel value of each point in the raw material image is set to 1;

in the step (2), the first convolutional layer has the number of output channels of 32, the convolution kernel size of 8×8, and the step size of 2;

a second convolutional layer has the number of input channels of 32, the number of output channels of 64, a convolution kernel size of 4×4, and a step size of 2; and a third convolutional layer has the number of input channels of 64, the number of output channels of 64, a convolutional kernel size of 3×3, and a step size of 1.

2. An electronic device, comprising:
one or more processors;
a memory; and
one or more programs;
wherein the memory is configured to store the one or more programs, and the one or more programs are configured to be executed by the one or more processors to implement an automatic stone arrangement method of claim 1.

3. A non-transitory computer-readable storage medium, wherein the computer-readable storage medium stores a program, and the program is configured to be executed by a processor to implement an automatic stone arrangement method of claim 1.

* * * * *